July 22, 1924.
R. G. CRANE
DENTAL APPLIANCE
1,502,292
Filed July 16, 1921    13 Sheets—Sheet 1
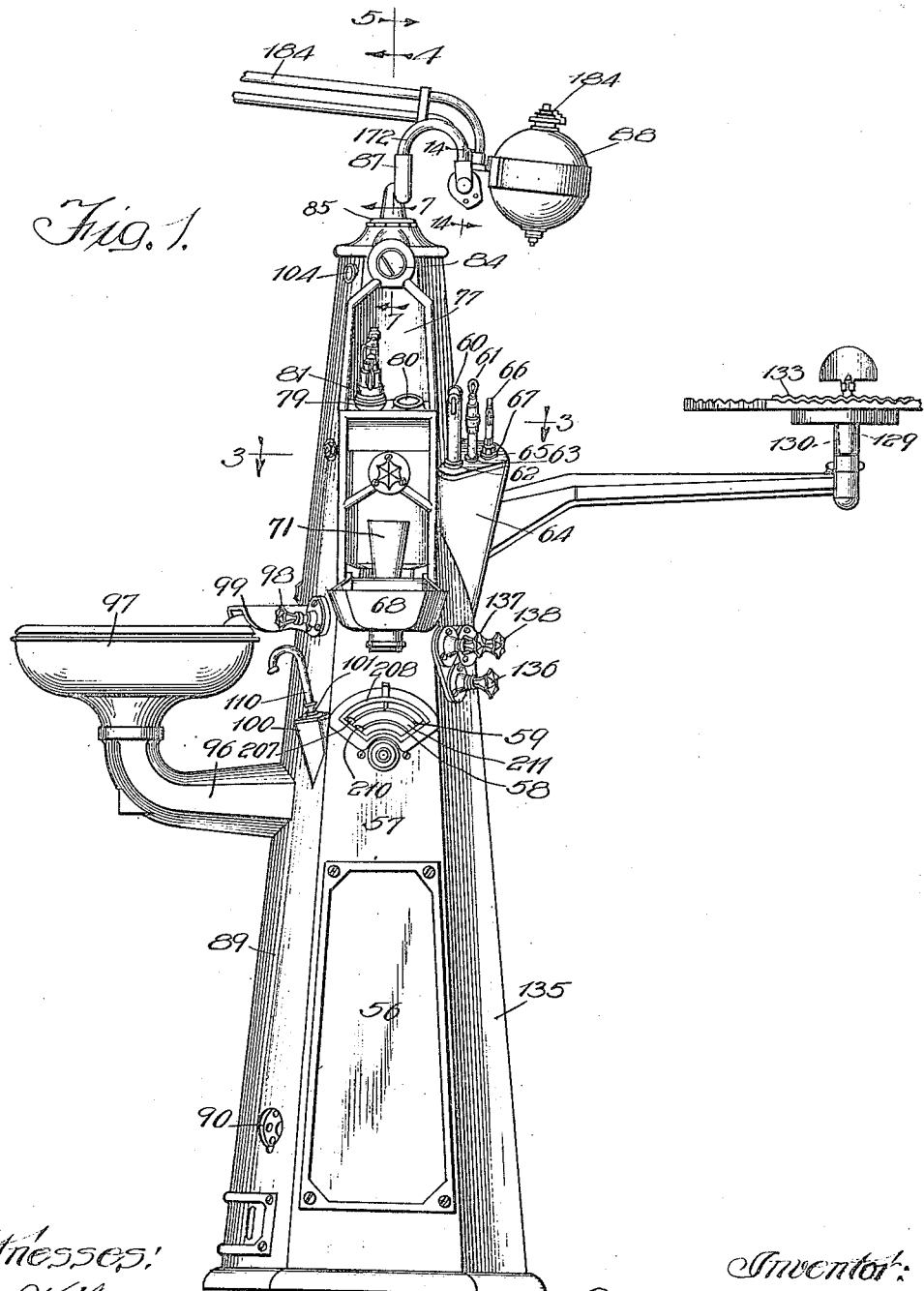

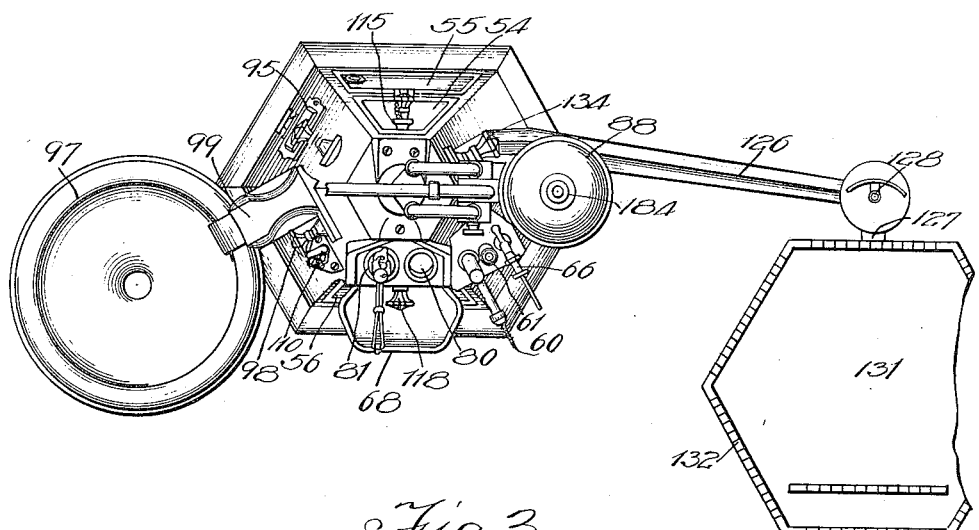
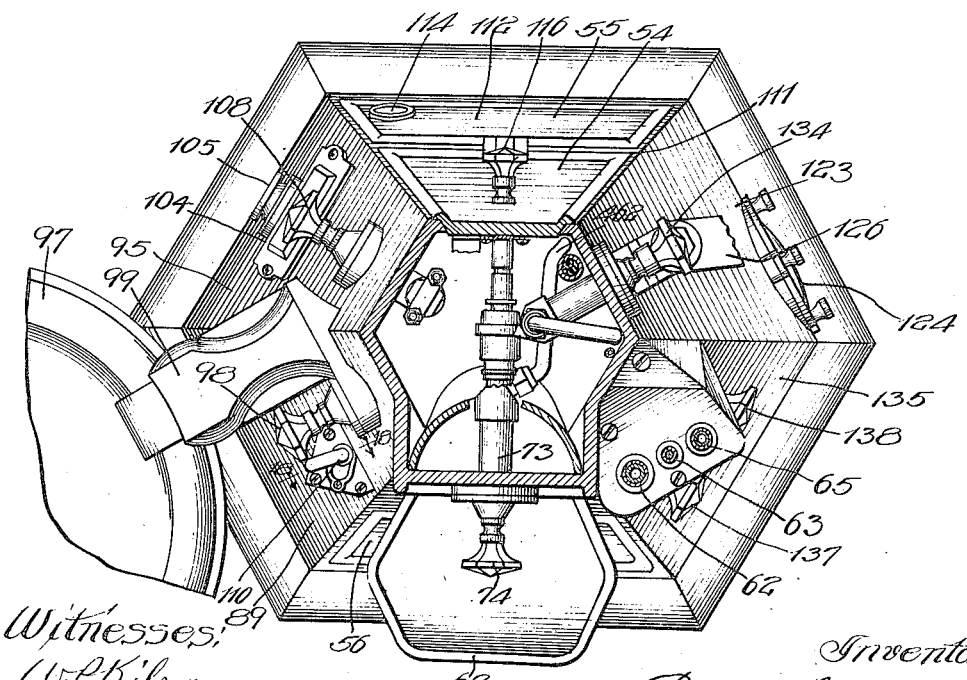

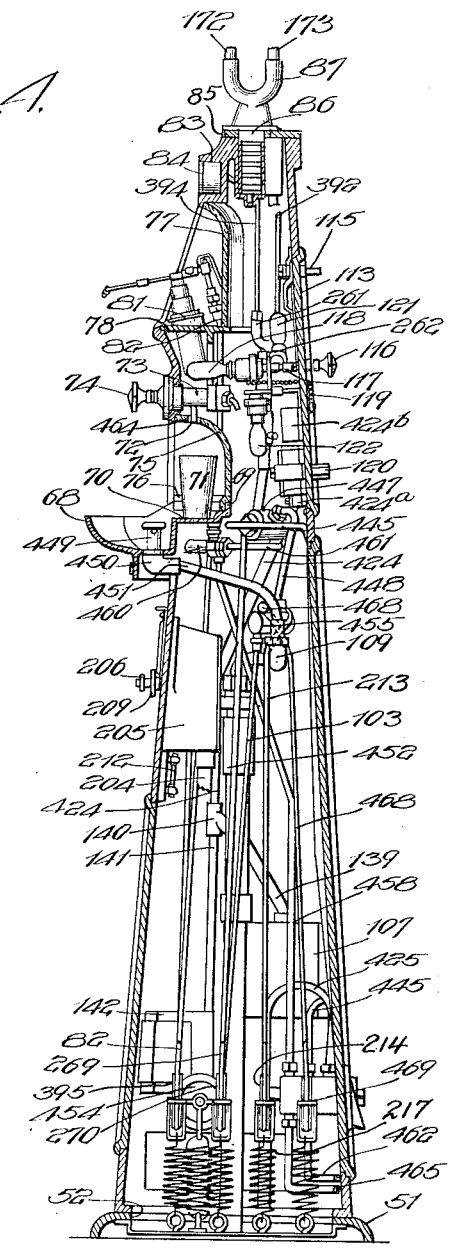

July 22, 1924.

R. G. CRANE

DENTAL APPLIANCE

Filed July 16, 1921   13 Sheets-Sheet 4

Witnesses:
W. F. Kilroy
Harry E. White

Inventor:
Robert G. Crane,
By John Howard McElroy
his Atty.

July 22, 1924.
R. G. CRANE
DENTAL APPLIANCE
Filed July 16, 1921  13 Sheets-Sheet 5
1,502,292
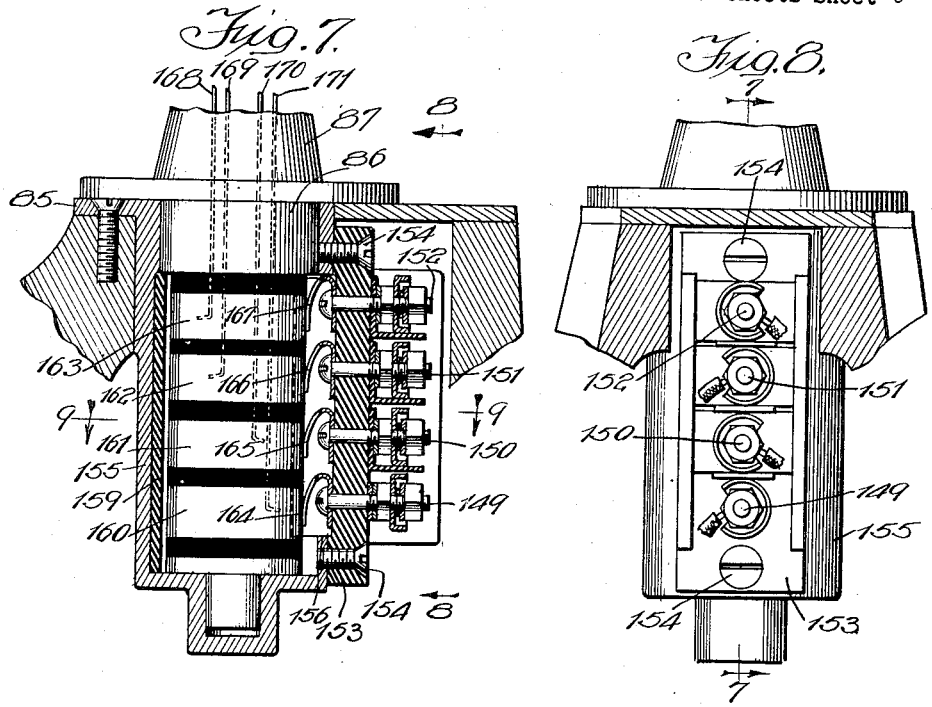
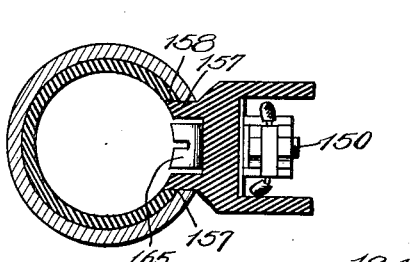
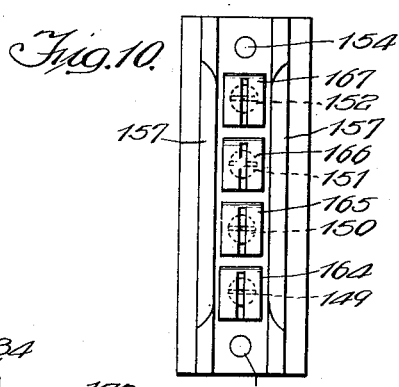
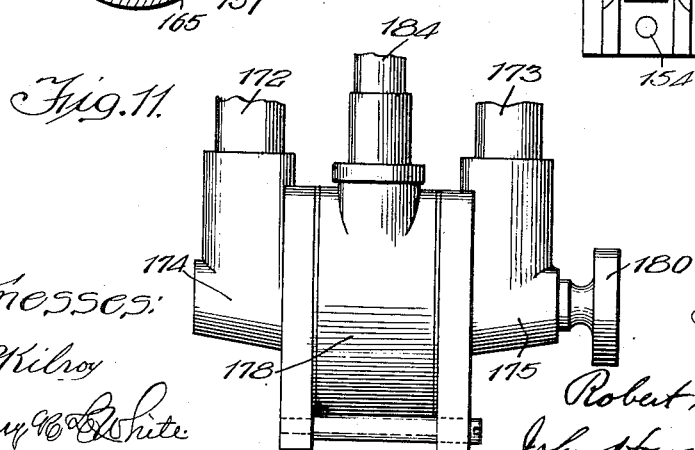
Witnesses:
W. T. Kilroy
Harry M. White
Inventor:
Robert G. Crane,
By John Howard McElroy
His Atty.

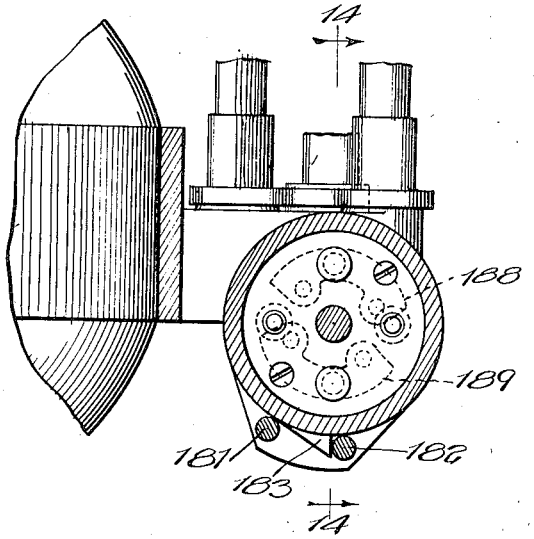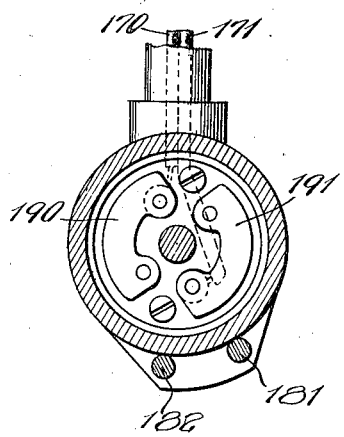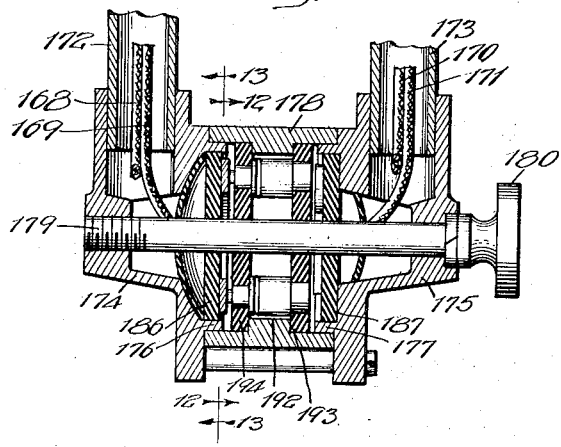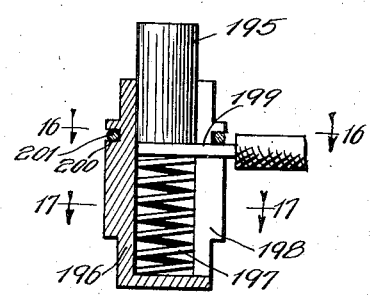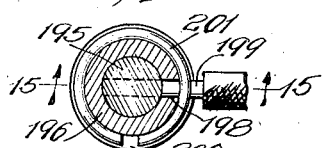

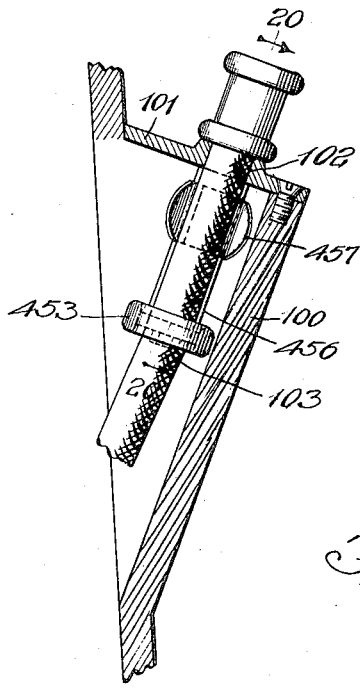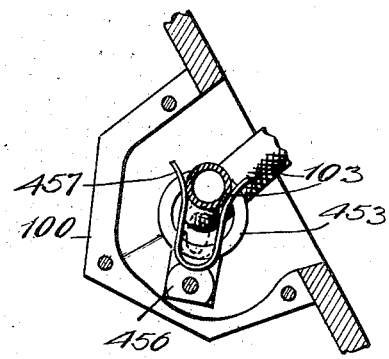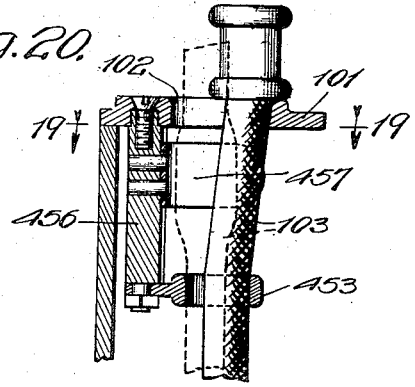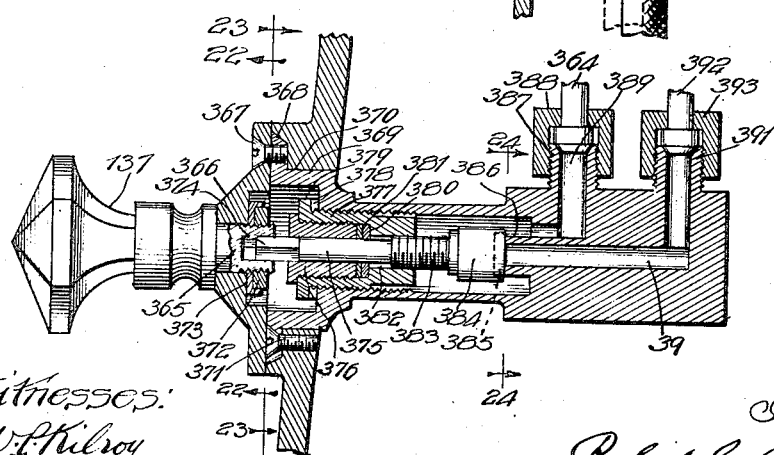

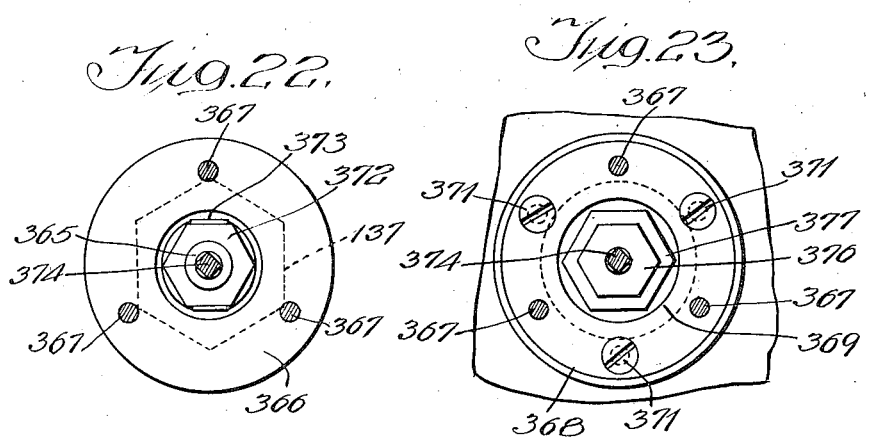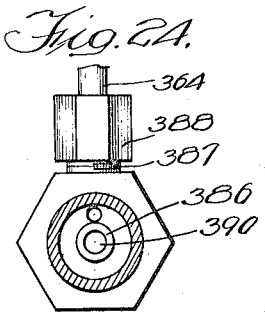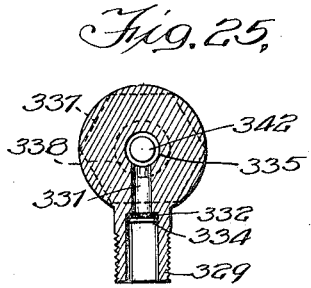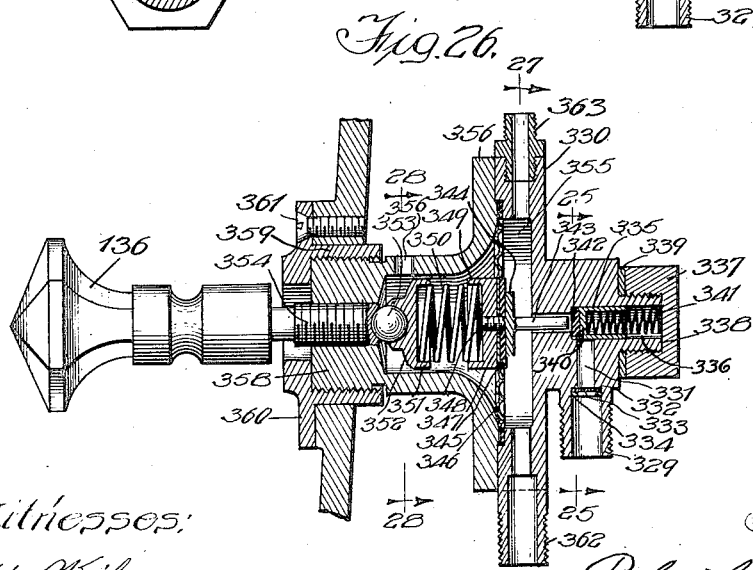

July 22, 1924.                                                     1,502,292
R. G. CRANE
DENTAL APPLIANCE
Filed July 16, 1921          13 Sheets-Sheet 9

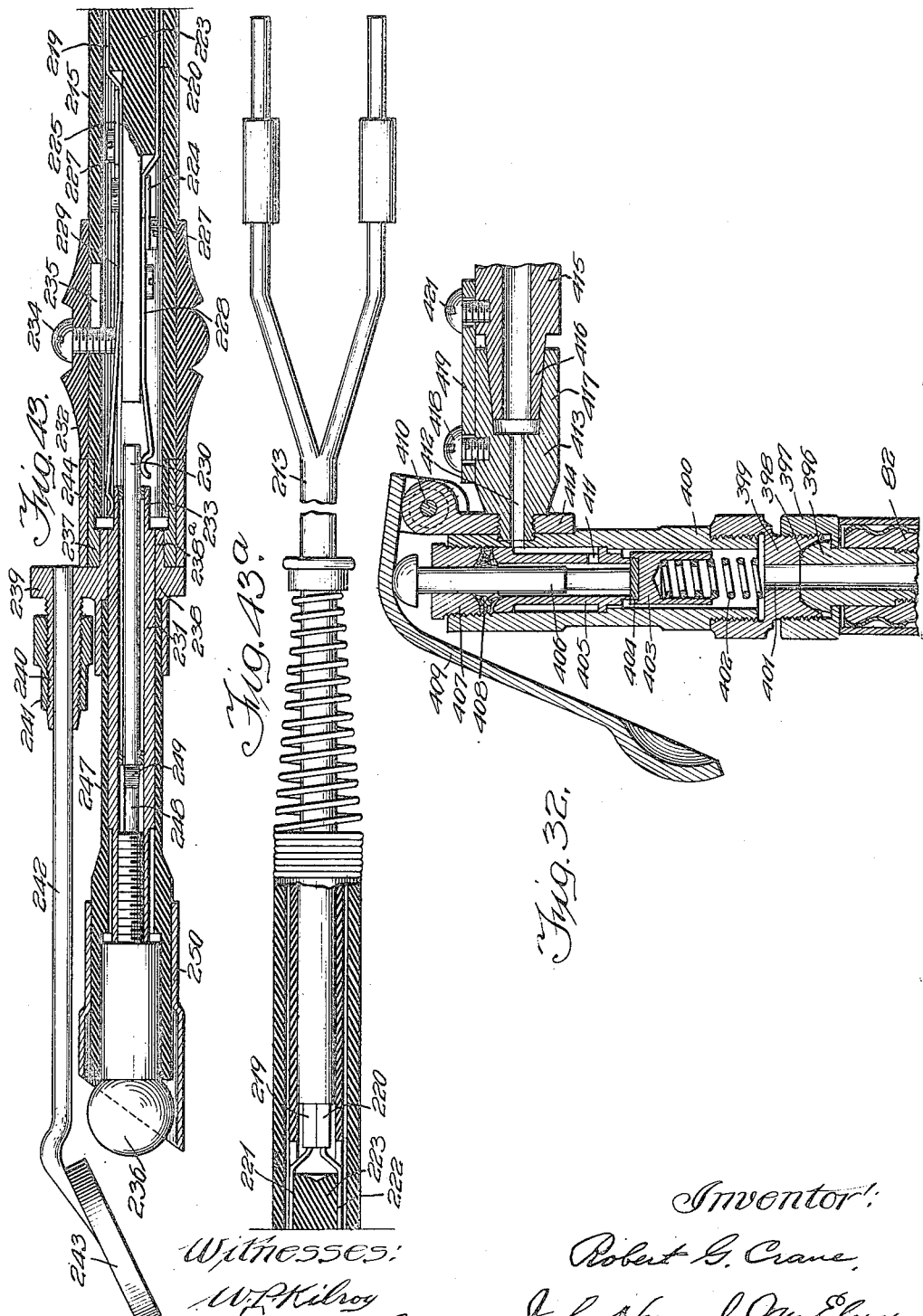

July 22, 1924.
R. G. CRANE
DENTAL APPLIANCE
Filed July 16, 1921 13 Sheets-Sheet 11
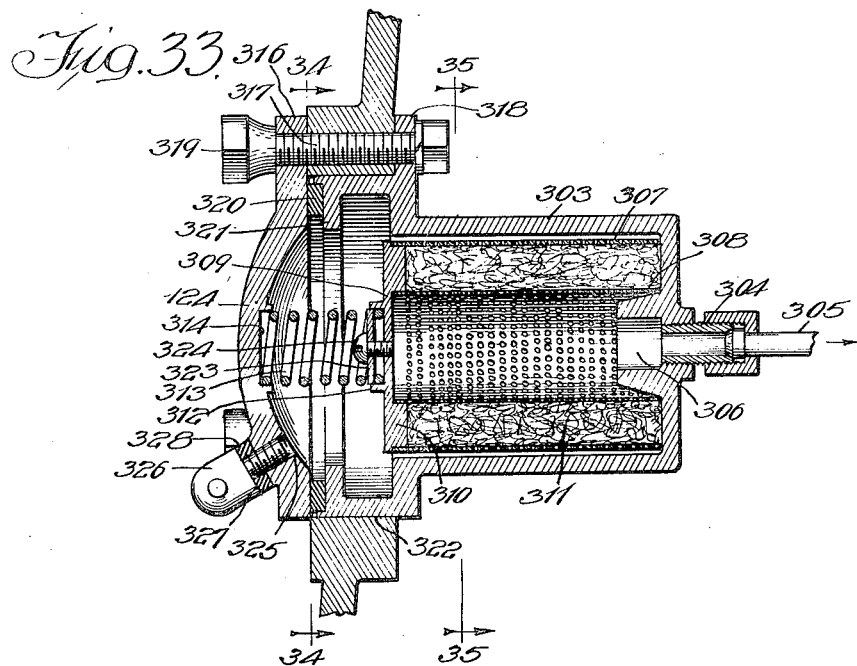
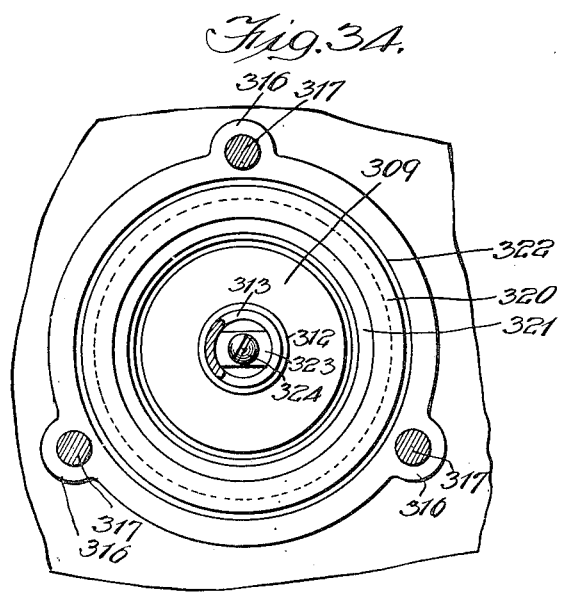
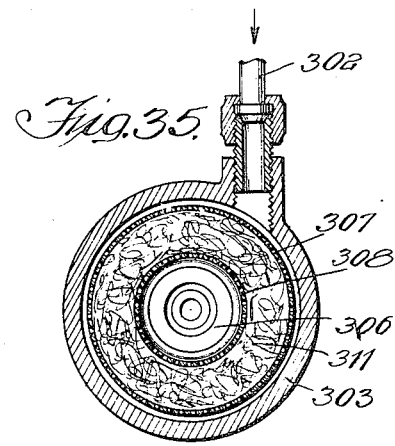
Witnesses:
W. F. Kilroy
Harry C. White
Inventor:
Robert G. Crane,
By John Howard McElroy
his Atty

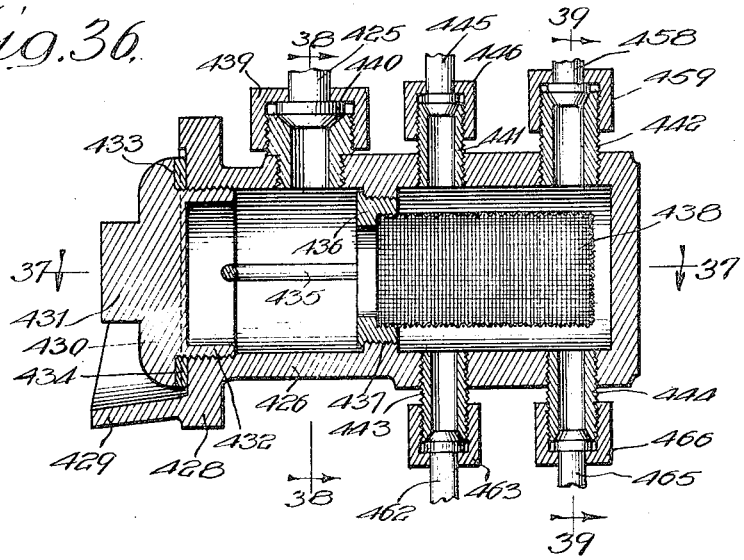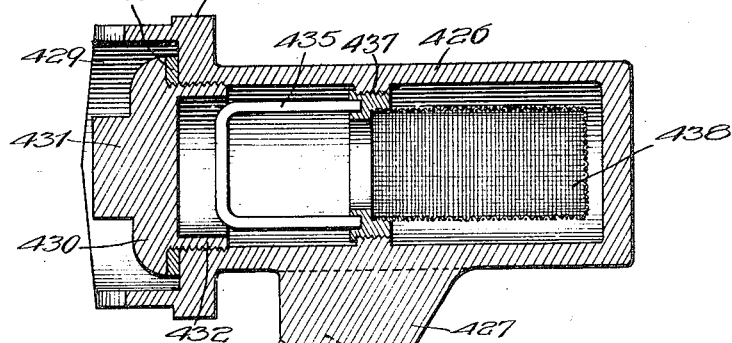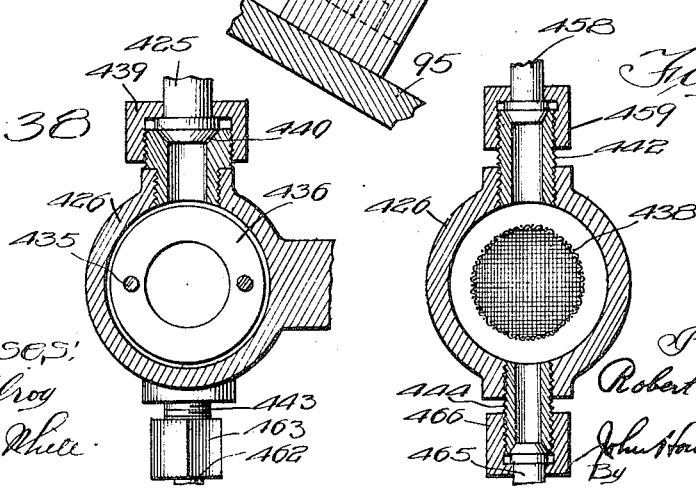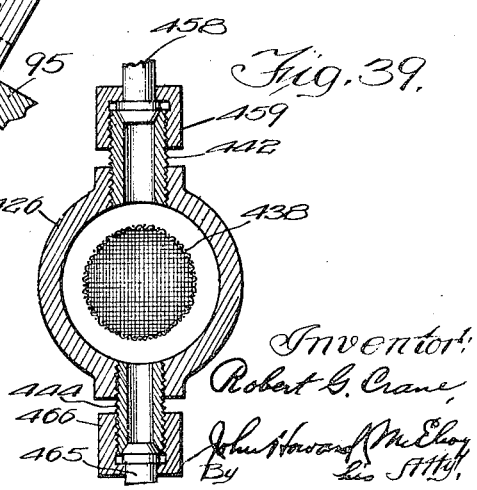

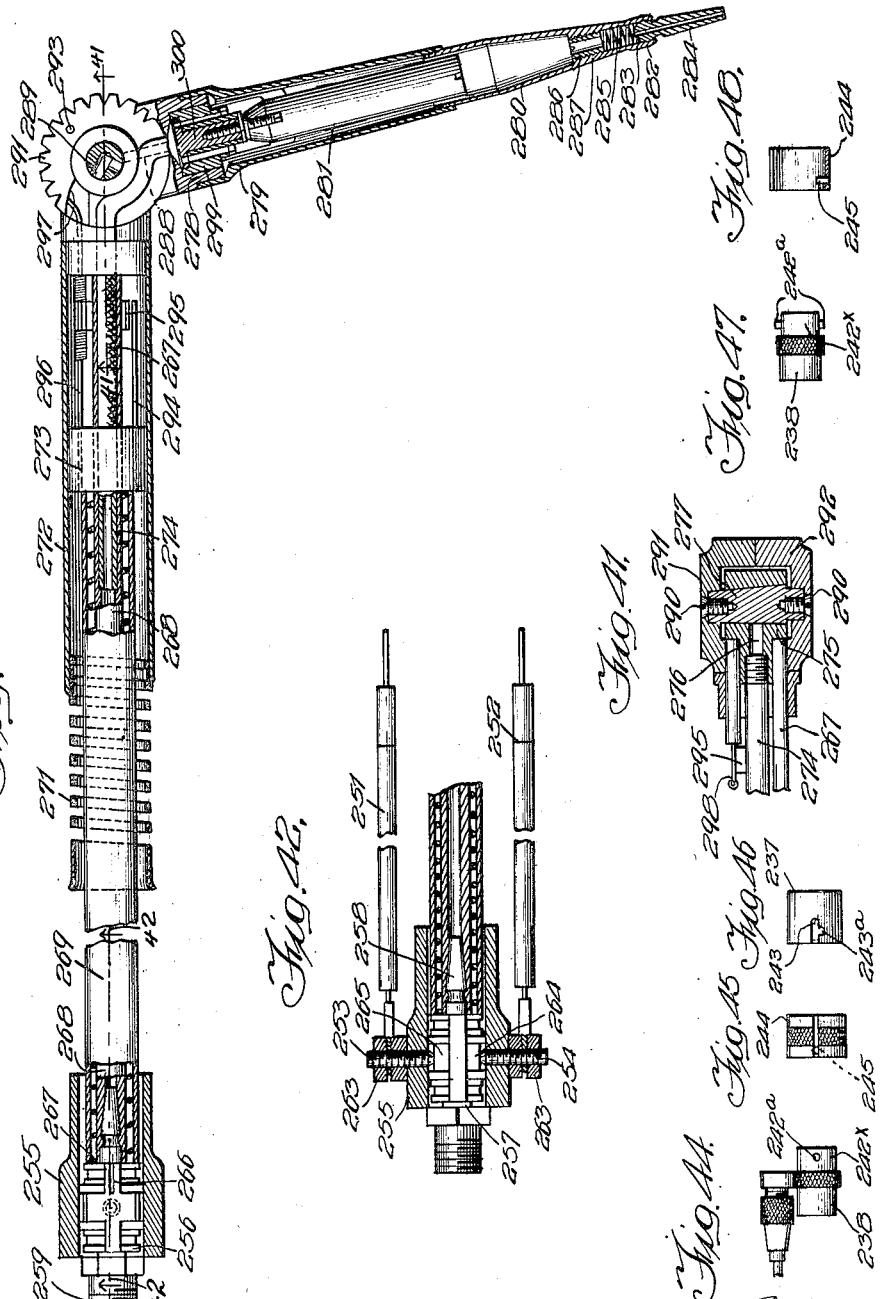

Patented July 22, 1924.

1,502,292

UNITED STATES PATENT OFFICE.

ROBERT G. CRANE, OF CHICAGO, ILLINOIS, ASSIGNOR TO A. C. CLARK & COMPANY, OF CHICAGO, ILLINOIS, A CORPORATION OF ILLINOIS.

DENTAL APPLIANCE.

Application filed July 16, 1921. Serial No. 485,167.

*To all whom it may concern:*

Be it known that I, ROBERT G. CRANE, a citizen of the United States, and a resident of Chicago, in the county of Cook and State of Illinois, have invented certain new and useful Improvements in Dental Appliances, of which the following is a full, clear, and exact specification.

My invention is concerned with dental appliances and more especially with such appliances in a form wherein they are adapted to be grouped in and upon a common pedestal forming a dental unit which places within easy reach of the operator substantially all of the appliances that he needs in working directly upon a patient seated in the customary chair.

To this end my invention is concerned with certain novel combinations of elements employed in such a unit, all of which will be fully described in the body of the specification and particularly pointed out in the claims.

To illustrate my invention, I annex hereto thirteen sheets of drawings in which the same reference characters are used to designate identical parts in all the figures of which—

Fig. 1 is a front elevation of the complete unit, with portions of the dental engine bracket and of the table broken away;

Fig. 2 is a top plan view of the same;

Fig. 3 is a top plan view on a larger scale in section on the line 3—3 of Fig. 1;

Figure 5:
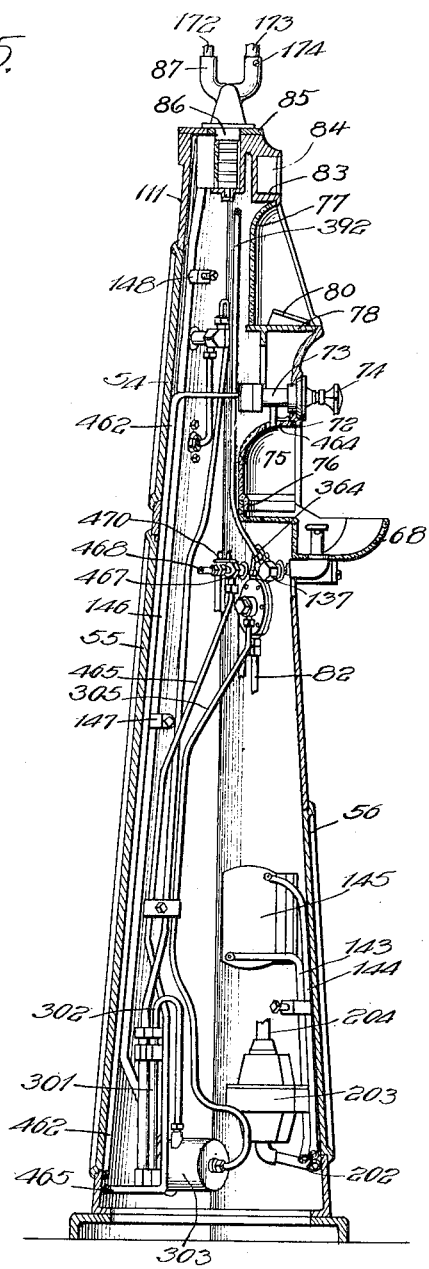
Figure 6:
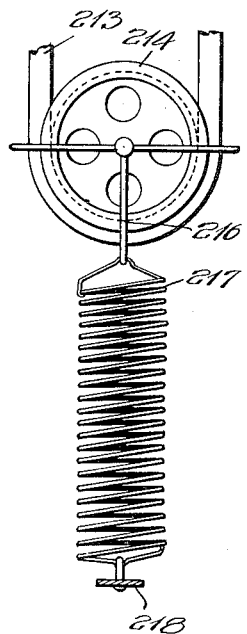
Figure 27:
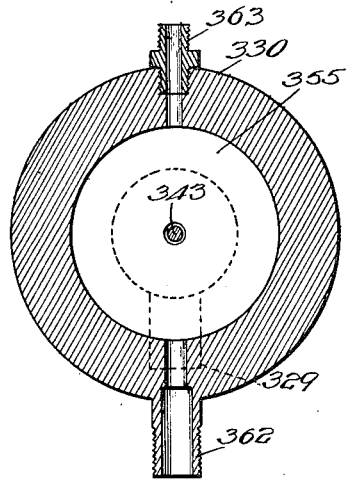
Figure 28:
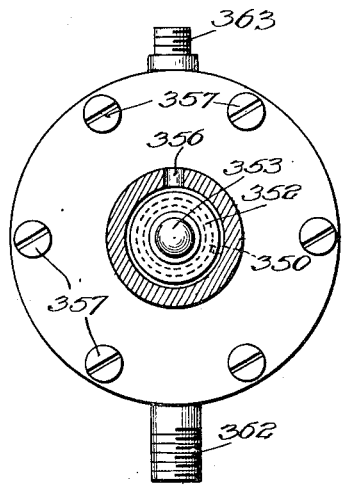
Figure 29:
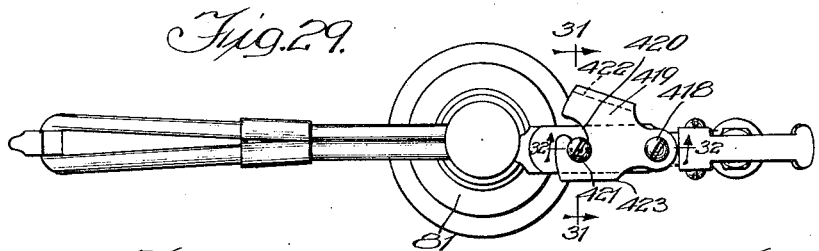
Figure 30:
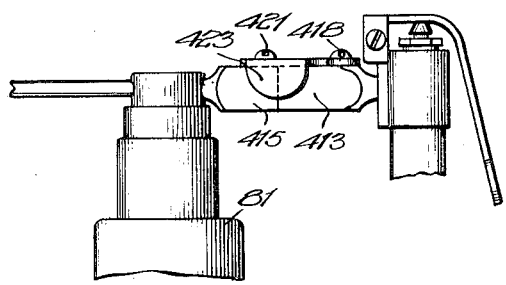
Figure 31:
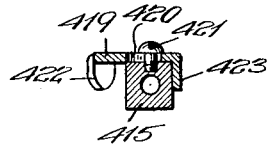

Figs. 4 and 5 are central vertical sections on the lines 4—4 and 5—5, respectively, of Fig. 1;

Fig. 6 is an enlarged detail showing one of the cable returning pulleys and its attached spring;

Fig. 7 is an enlarged detail in central vertical section through the top of the pedestal, as seen on the line 7—7 of Fig. 8, showing the socket and spindle for the dental engine;

Fig. 8 is a view in section on the line 8—8 of Fig. 7;

Fig. 9 is a view in section on the line 9—9 of Fig. 7;

Fig. 10 is a detached view of an insulating block as seen looking from the center of Fig. 9;

Fig. 11 is an enlarged detail of the mounting for the motor;

Figs. 12 and 13 are views of said mounting in section on the lines 12—12 and 13—13, respectively, of Fig. 14;

Fig. 14 is a view in section on the line 14—14 of Fig. 12;

Fig. 15 is a still more enlarged detail in section on the line 15—15 of Fig. 16 showing one of the contacts;

Figs. 16 and 17 are details in section on the lines 16—16 and 17—17 of Fig. 15;

Fig. 18 is enlarged detail in section on the line 18—18 of Fig. 3;

Fig. 19 is a detail in section on the line 19—19 of Fig. 20;

Fig. 20 is a detail in section on the line 20—20 of Fig. 18;

Fig. 21 is an enlarged detail in central vertical section through the air and water valves;

Figs. 22, 23, and 24 are sections on the lines 22—22, 23—23 and 24—24, respectively, of Fig. 21;

Fig. 25 is a detail in section on the line 25—25 of Fig. 26;

Fig. 26 is a central vertical section through the reducing valve for the compressed air supply;

Figs. 27 and 28 are vertical sections on the lines 27—27 and 28—28, respectively, of Fig. 26;

Fig. 29 is a top plan view of the hot water spray bottle and its connections;

Fig. 30 is a side elevation of the same;

Figs. 31 and 32 are details in section on the lines 31—31 and 32—32 of Fig. 29;

Fig. 33 is a central vertical section through the air filter;

Figs. 34 and 35 are vertical sections on the lines 34—34 and 35—35 of Fig. 33;

Fig. 36 is a central vertical section on an enlarged scale through the strainer for the water supply;

Figs. 37, 38 and 39 are sections on the lines 37—37, 38—38 and 39—39 of Fig. 36;

Fig. 40 is a longitudinal section through the hot air syringe and a part of its connected flexible tubing;

Figs. 41 and 42 are sections on the lines 41—41 and 42—42, respectively of Fig. 40;

Figs. 43 and 43ª (Sheet 10) are longitudinal sections on an enlarged scale, through the examination lamp and its holder: and Figs. 44, 45, 46, 47 and 48 are details of a part of said holder.

In carrying out my invention in its preferred form, I employ a six-sided hollow pedestal 50 (see Figs. 1 to 4, inclusive) tapering from the bottom toward the top, and secured on a hexagonal base piece 51, having an opening 52 therein, through which the necessary water, compressed air and gas pipes, and electric cables may be introduced to the interior of the pedestal. In the back wall, I place the removable panels 54 and 55 and in the front wall the removable panel 56 secured by screws, or otherwise, as may be desired. In a suitable aperture in the front wall 57, I place a control box containing two rheostats 58 and 59 (to be further described hereinafter) for the hot air syringe 60 and the mouth lamp 61 which, when not in use, are seated in the sockets 62 and 63 extending inwardly at an angle to the perpendicular into the offset portion 64 of the pedestal, the top of which portion is closed by the cover plate 65. The water syringe 66 is seated in a similar socket 67 in the same cover plate 65. Above the rheostats is an overflow basin or finger bowl 68 preferably formed of opalescent glass, containing in its elevated rear portion 60 (which projects into the bottom of an opening in the wall 57) a seat 70 for a glass 71, (see Figs. 1 and 4) which centers beneath the nozzle 72 projecting downwardly from the water valve casing 73 (see Fig. 4) which valve is of any desired construction and is controlled by the knob 74, the front of the valve casing being passed through and secured in the wall 57. A canopy 75, also preferably composed of opalescent glass, overhangs the seat 70 and is provided at its lower end with an offset flange 76 cooperating with the rear portion 69 to position properly the cooperating parts. Beneath a similar canopy 77 located in a recess formed in the wall 57 is secured a horizontal plate 78 having in the front thereof a pair of inclined sockets 79 and 80 for a pair of spray bottles 81, only one of which is shown, or for a spray bottle and a hot water glass, as may be desired, and in the rear portion thereof behind the socket 79 a smaller socket (not shown) for the compressed air tube 82 adapted to be attached to either spray bottle 81, as hereinafter described. In a circular recess 83 in the top of the wall 57 is a pressure gauge 84 showing the air pressure in the tube 82 for the spray bottles 81. In the small horizontal top of the pedestal I form a recess closed by the socket casting plate 85, in which turns the spindle 86 of the fork 87 which supports, in a manner to be hereinafter described, the bearing supports for the customary dental electric motor 88.

On the adjacent face 89, see Fig. 1, I place a socket 90 for a connections plug (not shown) of a customary construction carrying a cable connected to the customary foot control box (not shown), which may be of any well known construction, in which pedals are provided to start, stop and regulate the speed of the motor or engine 88. Branching off from the junction of the face 89 and the adjacent face 95 is the hollow bracket 96 carrying the spittoon bowl 97 which may be of any well known construction with the waste water draining back into the pedestal through a pipe concealed in the bracket 96, and with the water supply pipe (not shown) controlled by the valve 98 leading from the interior of the pedestal to the interior of the spittoon concealed by the porcelain cover strip 99. The top of the small offset 100 is closed by the plate 101, having an elongated aperture 102 (see Fig. 20) for the saliva ejector tube 103, to be more fully described hereinafter. At the top of the face 89 is located a push button 104 to close an electric circuit (not shown) to a buzzer or call-bell to summon an assistant.

At the bottom of the face 95 is a valve 105 to control the water supply to the unit, and above it is a removable cover 106 to give access to the high voltage fuses (not shown) contained in the fuse box 107, seen in Fig. 4 toward the bottom of the right-hand side. Just above the level of the spittoon 97 is the valve 108 which controls the water which passes through a well known apparatus 109 (see Fig. 4) which through the action of the water supplied thereto creates an air suction through the saliva tube 103 to draw off the saliva through the ejector tube 110 placed in the top of the tube 103.

The rear face 111 of the pedestal is composed mainly of the two removable panels 54 and 55 previously mentioned, the lower panel 55 having a circular aperture 114 therein to give access to the water strainer to be subsequently described. The upper panel 54 is preferably hinged at its lower end and is held closed by the turn-button 115 at its upper end. A knob 116 connected to a rod 117 (see Fig. 4) sliding through the panel and carrying a water heating incandescent lamp 118 serves to regulate the degree of heat applied to the spray bottles 81 (or to the spray bottle and a warm water glass, not shown, which may be substituted for one of the spray bottles if preferred) by moving the light nearer to or farther from the bottles. A pull chain 119 passing through an aperture in the panel 113 and connected to the switch of the lamp 118 serves to light it when desired, and a turn-button 120 mounted in the lower part of the panel operates a switch which turns the current on to and off of all of the electrical equipment including the two incandescent lights 121 and 122 carried by the panel 54 back of the two canopies 75 and 77, thereby illuminating the opalescent glass of which they are composed and adding to the beauty of the unit.

On the side face 123, at the bottom, is secured the removable cover 124 for the air filter 125 to be fully described hereinafter. Above the level of the finger bowl 68 is pivoted the arm 126 which has the table arm 127 pivoted to its outer end, said outer end having a Bunsen burner 128 supplied with gas through a pipe (not shown) extending up through the interior of the pedestal and joined to an extension pipe (not shown) enclosed by the arm 126. A socket 129 (see Fig. 1) carried on the outer end of the arm 127 has journaled therein the downwardly extending bearing stud 130 for the six-sided table 131 for dental tools, said table having the flange 132 on its periphery with its upper edge waved, as shown, to hold the dental tools from movement thereon.

A supplementary flange 133 parallel to one of the six sides, and rising a little higher, furnishes an extra support for tools for wax impression, or any materials suspended therefrom, to keep said material off of the table. Above the arm 126 is located the valve 134 connected with the supply gas pipe in the pedestal to regulate the flame of the Bunsen burner 128.

The remaining face 135 carries the valve handles 136, 137 and 138, connected respectively to a pressure reducing valve (see Fig. 26) to be subsequently described, which regulates the pressure of the air which can be delivered to the hot air and water syringe valves respectively, these last mentioned valves (constructed as shown in Fig. 21) being controlled by the handles 137 and 138. Above these valves is the previously mentioned offset 64 containing the sockets 62, 63 and 67 for the hot air syringe 60, the mouth lamp 61 and the water syringe 66.

Having now described the general layout, I will take up the various details beginning with the wiring and mounting of the electrical engine equipment; following that with the wiring and electrical connections for the novel hot air syringe and mouth lamp. After the electrical equipment, the compressed air appliances, including the reducing valve, the hot air syringe and spray bottle appliances will be considered. After these, the water appliances, etc.

The two wires carrying the current at 110 volts enter preferably through the opening 52 in the base 51, and are carried by a pair of armored flexible conduits (not shown) to the bottom of the fuse box 107 (see Fig. 4) containing a pair of fuses (not shown) which are replaceable through the removable cover 106 (see Fig. 3). From the fuses the supply wires 140, enclosed in an insulating tube, pass through the section 424 of the tube to a terminal block 424ª secured on the back of the removable panel 54, whence they pass through the snap switch 120 on said panel by which the circuit is opened when the unit is not in use. From the snap switch 120 are the leads to a bus-bar (not shown) in the casing 424ᵇ on the rear of the panel 54 and from this bus-bar the wires (not shown) for the dental engine 88 pass back down through the section 424 and through the branch conduit 141 to the junction box 142, into which extends the contacts of the connections plug previously mentioned as not shown and carrying the engine wires to the foot control box (not shown) and back to the junction box. From the lower part of the junction box, a pair of conduits 143 and 144 (see Fig. 5) carry the wires for the field resistance 145 to and from said resistance so that the engine can be started and the speed controlled in the customary manner from the foot control box (not shown). The four wires (not shown) for the field and armature circuits of the engine 88 are carried from the bottom of the junction box through the conduit 146 (see Fig. 5) held against the inner wall of the pedestal by suitable clips 147 and 148, to the four binding posts 149, 150, 151 and 152 (see Figs. 7 to 10) secured in the bottom of the channel of the insulating block 153 fastened by the screws 154 to one side of the sleeve or socket 155 extending downward from the previously mentioned socket casting plate 85 adjacent a rectangular opening 156 in said sleeve, into which opening fit the flanges 157 of the block 153, which flanges also extend into a similar opening 158 in the insulating sleeve 159 seated in the socket 155. The spindle 86 turning in the insulated socket carries four insulated collector rings 160, 161, 162 and 163, connected by the spring contacts 164, 165, 166 and 167 with the binding posts 149, 150, 151 and 152. Extending up through the hollow spindle 86 and connected respectively to the rings 160, 161, 162 and 163 are the wires 168, 169, 170 and 171 for the field and armature circuits of the motor 88, the wires 168 and 169 extending through the inverted U-shaped tube 172 (see Fig. 1) secured in one branch of the fork 87, while the wires 170 and 171 extend through the similar tube 173 secured in the other branch of the fork 87 by the set screw 174 (see Fig. 5) so that by loosening the screw, the tube 173 can be turned away from the tube 172 to remove the motor or give access to the connections. The other ends of the tubes 172 and 173 are secured in symmetrical socket pieces 174 and 175 (see Fig. 14) having the opposed annular flanges 176 and 177 on which is pivoted the extension 178 of the casing of the dental engine 88. The two socket pieces 174 and 175 are removably held in position so the engine can swing a few degrees in a vertical plane, on the flanges 176 and 177, by a bolt 179 having the milled head 180 and passing through the socket piece 175 and threaded into the piece 174, and by the smaller screw bolts 181 and 182 passed through apertures in the socket piece 175 and threaded into the piece 174. A lug 183 projecting from the extension 178 between the screw bolts 181 and 182, as seen in Fig. 12, limits the swinging of the engine 88 in a vertical plane, while permitting it to swing as much as may be necessary to move the rotating tool (not shown) carried in the customary manner by the customary frame 184 (seen broken off in Fig. 1) and driven by the customary belt (not shown) driven by the sheave 185 on the armature shaft of the engine 88. The socket pieces 174 and 175 have recesses for the insulating disks 186 and 187 (see Fig. 14) therein, and on the outer surface of the disk 186 is a pair of contact segments 188 and 189 connected to the wires 168 and 169, while on the outer surface of the disk 187 is a pair of contact segments 190 and 191, extending at right angles to the segments 188 and 189, and connected to the wires 170 and 171 (see Figs. 12 and 13). Secured in the extension 178 and resting against the internal annular flange 192 is a pair of insulating disks 193 and 194, each containing four apertures 90 degrees apart in which are mounted four sliding contact members 195, one of which is detailed in Figs. 15, 16 and 17, where it will be seen to consist of a metal stud, sliding in a sleeve 196, having reduced ends entering the apertures in the disks 193 and 194, one end being open to receive the plunger 195, the other being closed to confine the helically expanding spring 197, which serves to force the plunger 195 against its associated contact 188, 189, 190 or 191, as the case may be, with a yielding pressure. A slot 198 in one side permits the entry of the non-insulated end of the wire 199 associated with it and which extends to or from the armature or the field winding, as the case may be, of the motor 88. An annular groove 200 in the sleeve 196 carries a split ring 201, which is turned to hold the wire 199 in place after the parts are assembled. By the connections shown, it will be obvious that the engine 88 will run in any position to which it can be moved, either by swinging it in a vertical plane about the bolt 179 as a center, or in a horizontal plane about the spindle 86.

Also extending upward from the junction box 142 is a conduit 202 (see Fig. 5) carrying a pair of wires to the transformer 203, suitably secured on the inner wall of the pedestal, and serving to reduce the 110 volt current to 16 volts. A conduit 204 (mostly broken away in Figs. 4 and 5) carries two pair of wires (not shown) from the low voltage side of the transformer to the rheostats 58 and 59 mounted in the casing 205 secured on the inner front wall of the pedestal, and having the knob 206 on a shaft connected to the pointer 207 (see Fig. 1) cooperating with the scale 208 of mouth lamp rheostat 59, while another knob 209 secured on a sleeve is connected to the pointer 210 cooperating with the scale 211 of the hot air syringe rheostat 58, so that by manipulating the knobs 206 and 209 the degree of illumination furnished by the mouth lamp 61 and the degree of heat applied to the air issuing from the hot air syringe 60 can be accurately controlled, it of course being understood that both operate with lower voltages, the rheostats being scaled from 1 to 7 volts. The resistance in the rheostats may be of any desired form and arranged in any desired manner. At the bottom of the rheostat casing 205 are four low voltage fuses 212 arranged side by side (one being seen in Fig. 4) connected at one side to their respective rheostats and at the other side to four wires (not shown), two being placed in a cable 213 suitably led from the fuses 212 connected to the mouth lamp rheostat 58 and securely looped over the saliva ejector apparatus 109, and thence descending about a pulley 214 (shown on a larger scale in Fig. 6) and ascending to the mouth lamp socket piece 215, shown in detail in Fig. 43. As it is desired to draw the cable 213 automatically back through its socket 63 into the interior of the pedestal as soon as it is released, the pulley 214 has attached to the bottom of its skeleton wire casing 216 which keeps the cable in place, a helical contractile spring 217, the other end of which is secured to a metal strip 218 extended across the opening 52, and secured to the base piece 51. As there are four other similar cables and sheaves to be held in place in the pedestal and returned by four other similar springs, it is obvious that these springs have a very important function and operation, they serving to permit the ready withdrawal of the mouth lamp, hot water syringe, cold water syringe, the hot water spray bottle and the saliva ejector one by one, as needed, and then automatically to return them when released, without the five cables either becoming entangled, or clashing with the other parts.

The two wires 219 and 220 in the cable 213, as seen in Figs. 43 and 43ª, Sheet 10, have their ends stripped of insulation and led through grooves 221 and 222 formed in the circular body portion of the bakelite insulating plug 223, and soldered to the contact clips 224 and 225 having the recesses therein through which pass the screws 227 through the spring contacts 228 and 229 and screwed into the flattened portion of the plug 223. The curved end of the spring 228 engages the brass rod 230, which extends through but is insulated from the brass tube 231, which has the reduced end portion 233 adapted to be engaged by the curved end of the spring 229 when the switch sleeve 232 is shoved outward on the rubber tube 215 to bring the inner end of the screw 234 extending through the slot 235 into engagement with the outwardly bent portion of the contact 229. When the sleeve 232 is shoved back, the lamp 236 is extinguished. The end of the hard rubber tube 215 has its outer end reduced, and screwed on said reduced end is the metal sleeve 237 having its outer end internally threaded to receive the threaded end of various implements adapted to co-operate therewith. With the mouth lamp shown the holding block 238 has the reduced portion 242ˣ slipped thereon, and held by the bayonet joint to be described (see Figs. 44 to 48). It also has an offset portion 239 which has the split sleeve portion 240 externally threaded to receive the nut 241 which, when it is screwed inwardly, serves to clamp the split sleeve portion 240 on the end of the rod 242 inserted therein and carrying on its outer end the mirror 243. To receive the diametrically opposed pins 242ᵃ projecting radially from the reduced portion 242ˣ, the sleeve 237 has the diametrically opposed slots 243 in its outer end each with the offset 243ᵃ therein. A split ring 244 with the pin 245 projecting inwardly into one of the slots 243 fits over the sleeve 237. When the mouth lamp is to be used the sleeve 232 being shoved back to open the circuit, the ring 244 is shoved back until the pin 245 is not in the slot 243. The portion 242ˣ is then slipped into the end of the sleeve 237 until the pins 242ᵃ are opposite the offsets 243ᵃ when it is turned to bring the pins 242ᵃ into the offsets. When the sleeve 232 is shoved out to close the circuit, the ring 244 is shoved out as far as it can go, in which position the pin 245 is in the slot 243 opposite the offset 243ᵃ so that the lamp holder cannot possibly be pulled out accidentally. The tube 231 passes through the body of the block 238 and is partly surrounded by the hard rubber sleeve 247, the enlarged outer end of which forms the socket for the lamp 236. This is of a known construction. One terminal of the lamp engages the sleeve 231 and the other, the rod 248, carries on its end the coiled expanding spring 249 which engages the rod 230. A sleeve 250 having its smaller end fitting friction tight on the sleeve 247 has its longer end slanting, as seen, to form a shade for the lamp.

The other two wires 251 and 252 from the low voltage fuses 212 extend to the contact screws 253 and 254 (see Fig. 42), which are threaded through the hard rubber insulating sleeve 255 surrounding the fiber insulating tube 256 which is fastened over the tube 257 terminating in a nipple 258. This tube 257 has the other threaded end 259 much enlarged and forming a seat for a connection 260 extending down from the U-shaped tube 261 (see Fig. 4) which is supplied with compressed air, as will be hereinafter described. A nut 262 cooperating with the threaded end 259 serves to draw the connections air-tight. The nuts 263 on the screws 253 and 254 (see Fig. 42) serve to secure the wires 251 and 252 thereto, and the inner ends of these screws 253 and 254 engage the small contact plates 264 and 265 held in the grooves of the insulating tube 256. The ends of the plates 264 and 265 have the wires 266 and 267 soldered thereto, and these wires are coiled in separated helixes about the flexible compressed air tube 268 secured on the nipple 258. Another larger flexible insulating tube 269 encloses the wires 266 and 267, which in turn enclose, as it were, the air tube 268. This tube 269 runs around the sheave 270 (see Fig. 4), mounted just like the sheave 214, and has its other end extending up through the socket 62 provided for the hot air syringe 60, the details of which are shown in Figs. 40 and 41.

The tube 269 passes through the helically coiled protecting spring 271, which is supported by having its inner end fitting friction tight in the metallic tube 272, which has secured therein at about its middle the short hard rubber cylinder or disk 273 through the center of which passes the brass tube 274 having its upper end screwed into the metal valve block 275. This tube 274 has its outer surface covered with insulation, and its lower end has the air tube 268 drawn over it so that the compressed air carried thereby is delivered to the passage 276 extending to the center of the valve block 275 which has the customary tapered valve member 277 fitted therein. The block 275 has the extension 278, externally threaded, to have the tapering sleeve 279 screwed thereon, and this sleeve has the still more tapered extension 280 screwed therein, so that it can be taken out to renew the heating element 281 supported therein as will be hereinafter described. The extension 280 has its end 282 enlarged to form a socket for the ball end 283 of the nozzle 284 held therein in any position of adjustment by the helically coiled expanding spring 285 held against it by the externally threaded plug 286 screwed into the contracted internally threaded portion 287 of the extension 280. The block 275 has a passage or port 288 from its center through the extension 278, and the valve member 277 has the passage 289 therethrough connecting the passages 276 and 288 when it is turned to the operative position. This member 277 has secured thereto by the screws 290 the complementary hard rubber cups 291 and 292 which are secured to each other by the pin 293, and which embrace most of the valve block 275. The cups 291 and 292 have their exposed periphery corrugated so they can be readily turned by the thumb while the syringe is held in the hand.

The wire 266 is connected at the disk 273 with the contact strip 294 extended therethrough and supported thereby with its free end adjacent the contact clip 295 supported by the spring 296, which in turn is supported from the disk 273 and has its free end curved as shown and extending to the shoulder 297 in the cup 291 so that when the cup is turned to open the valve 277 to the passage of the compressed air, the shoulder 297 will bend the spring 296 so as to bring the clip 295 into electrical contact with the contact 294 closing the circuit through the heating element 281 to warm the air flowing past it. The contact clip 295 is soldered to the wire 298 which is guided in a channel formed in one side of the block 275 to the hard rubber insulating block 299 seated in the extension 278 where it is connected to one terminal of the heating element 281 which is screwed into the metal plug 300 centrally located in the block 299. The wire 267 extends through the disk 273, and is guided in a similar channel on the other side of the block 275 to the other terminal of the heating element 281.

I attach much importance to the feature of passing the air through a central tube, which together with the wires, are surrounded by the external tube, as this insures that the wires can never be short circuited by any moisture which might be carried into and left in the central tube by the air passing therethrough.

The compressed air for operating the hot air syringe and the hot water spray bottle is supplied as follows: The compressed air is brought into the pedestal by a tube (not shown) which is connected to the lower end of the flexible pipe section 301 (see Fig. 5) which is connected to the rigid tube 302 which opens into the top of the air filter casing 303 (see Figs. 33 to 35). This casing has the main cylindrical portion with the outlet connection 304 connected to the outlet pipe 305. Projecting inwardly and surrounding the outlet is the annular flange 306 externally tapered, which serves to seat the filter cup which consists of the concentric perforated cylinders 307 and 308 connected by the disk 309 having the annular flange 310 on its inner face, to the parallel faces of which the ends of the cylinders 307 and 308 are secured. The annular space between these cylinders is filled with cotton 311 which serves as the air filtering medium. The head or disk 309 is provided on its outer face with the annular flange 312 within which is seated one spire of the helically coiled expanding spring 313, the other end of which is seated in the circular recess 314 in the inner face of the closure cap 124 having the three ears 316 which are apertured to pass over the bolts 317 passed through ears 318 on the adjacent end of the casing 303 and screwed through the side 123 of the pedestal. Cap nuts 319 hold the cap 124 in place, and the closure is made air-tight by the soft rubber ring 320 seated on the annular flange 321 formed on the enlarged similar end of the casing 303 which fits in the annular aperture 322 formed in a thickened portion of the side 123 of the pedestal. I preferably secure the spring 313 in place by a clip bar 323 passed across the flange 312 over a spire of the spring and fastened by the screw 324. If it is desired to release the pressure in the filter, I provide a threaded port 325 in which is screwed the plug 326 having the shoulder 327 on which to seat the soft rubber annulus 328 by which the closure is made air-tight.

The filtered compressed air passes upward through the pipe 305 to the inlet nipple 329 (see Figs. 26 to 28) of the reducing valve casing 330, which nipple has the passage therethrough with a reduced portion 331 providing an annular seat 332 against which I preferably place the screen 333 held in place by the split expanding ring 334. The port or passage 331 is closed by a cylindrical valve 335 sliding in the circular passage 336 through the thickened axial portion of the casing 330, the end of the passage being closed by the cap nut 337 screwed on to the reduced portion 338, the joint being made air-tight by the soft rubber annulus 339 provided for that purpose. The valve 335 is preferably a hollow cylinder except for the septum 340 against one side of which presses the helically coiled expanding spring 341 confined in the hollow of the valve and the passage 336. One or more cushion disks 342 are placed on the other side of the septum and are engaged by the pin 343 extending from the disk 344 held against the disk 345 which is clamped against the center of the diaphragm 346 by the nut 347 screwed on to a threaded extension 348 of the pin 343. The nut 347 has the annular flange 349 which positions one end of the helically expanding spring 350, the other end of which is positioned by the flange 351 of the disk 352 which has on its opposed face the semispherical recess for the anti-friction steel ball 353 held between it and a similar recess in the adjacent end of the screw 354 to the outer end of which the regulating valve handle 136 is secured. The diaphragm 346 is of corrugated metal covering the shallow cylindrical recess 355 in the casing 330, and is clamped in place between the main body of the casing 330 and the supplemental casing 356 by the screws 357. This supplemental casing has the cylindrical extension containing the spring 350 and having the threaded end 358 screwed into the cap piece 359 seated in a circular aperture in the face 135 and having the annular flange 360 through which the screws 361 pass into the face 135 to secure the regulating valve in place. From the recess 355 a nipple 362 extends downwardly to form a connection with a pipe leading ultimately to the hot water spray bottle, and another nipple 363 extends upwardly for the connection with a pipe leading ultimately to the hot air syringe.

The action of this reducing valve will be readily apparent: By turning the handle 136, the tension of the spring 350 on the diaphragm can be regulated to control the pressure to which the compressed air is to be reduced, and it will be obvious that when the pressure falls in the cavity 355 the spring 350 acting on the diaphragm 346 will move the pin 343 to slide the valve 335 to admit compressed air to the cavity 355 through the passage 331 until the pressure of the air moves the diaphragm back against the tension of the spring 350, the general action being that of an ordinary reducing valve.

From the nipple 363 the pipe 364 (see Fig. 5) passes to the control valve 137 for the hot air syringe supply, which valve is shown in detail in Figs. 21 to 24. The handle 137 has its threaded and socketed end 365 passed through the unthreaded circular aperture in the cover disk 366, secured by the screws 367 to the annular flange 368 on the cup-shaped outer end 369 of the valve casing which outer end fits in the circular aperture 370 formed in the section 135 of the pedestal casing, where it is held by the screws 371 passed through the flange 368 into the pedestal. The handle 137 is held in place, but free to turn, by the nut 372 secured on the reduced end 365 and held from turning loose by the washer 373 secured on the reduced end and having portions of its ends turned over the six-sided nut 372, as seen in Fig. 22. The rectangular socket in the reduced end 365 is partially occupied by the rectangular end 374 of the valve stem 375 which turns and slides in the packing gland 376 screwed into the externally and internally threaded nut 377, which in turn is screwed into the bottom of the cup portion 369 of the valve casing, a packing ring 378 being placed between the bottom of the cup portion and the flange 379 of the nut 377. The internal diameter of the nut 377 is reduced, forming a shoulder 380 against which the packing washers 381 are forced by the gland 376. The reduced portion 382 is internally threaded to cooperate with the threaded portion 383 of the valve stem 375, which stem terminates in the enlargement 384 having a seat in its end for the rawhide disk 385 which cooperates with the nipple 386 formed in the bottom of the main cavity in the valve casing. By turning the handle 137, it will be obvious that the valve formed by the disk 385 cooperating with the nipple 386 may be adjusted as desired to regulate the pressure of the air that can pass the said valve, it reaching it through the pipe 364 held to the nipple 387 by the nut 388 and the angular passage 389 through the nipple and valve casing. A passage 390 leads from the nipple 386 to the nipple 391 to which the pipe 392 is screwed by the nut 393. This pipe 392 leads to one end of the U-shaped tube 261, (see Fig. 4) thus supplying compressed air to the hot water syringe, while the pipe 394 connects the other end of the U-shaped tube 261 to the pressure gauge 84 seated in the recess 85 in the top of the pedestal, which thus indicates the pressure secured by adjusting the valve 137.

The tube 82 (see Figs. 4 and 5) connected to the nipple 362 of the pressure reducing valve 136 extends downward around the sheave 395 mounted and operating in the same manner as the sheave 214, and thence upward through the smaller socket (not shown) in the plate 78 back of the socket 80, and is connected to the spray bottle 81, as shown in Figs. 29 to 32, where it will be seen that the end of the tube 82 has a nipple 396 connected to it and held by the connecting nut 397 in air-tight engagement with the seat 398 formed in the bottom piece 399 of the valve casing 400 upon which it is screwed. The piece 399 has the passage 401 therethrough and also supports the helically coiled expanding spring 402, the other end of which extends into the hollow body 403, which carries the leather disk 404 in its upper end which is normally held seated upon the reduced lower end of the tube or valve casing 405 which is held air-tight in the top of the casing 400. A valve 406 slides through the gland 407 screwed in the top of the casing 400 and the packing 408 pressed by it against the top of the tube 405. The bottom of the valve 406 seated on the disk 404, and when it is pressed down by the operating lever 409 fulcrumed at 410, the compressed air passing around the valve 406 passes through the port 411 in the casing 405 and on and up around the reduced portion of the casing 405 into the passage 412 extending through the female connection 413 screwed through the bearing bracket 414 and into the casing 400.

The spray bottle 81 is of known construction and is provided with the male connection 415 having the tapered nipple 416 fitting air-tight into the correspondingly tapered seat 417 in the connection 413. Quickly and easily to connect and disconnect the spray bottle from the valve, I pivot on the top of the connection 413 by the screw 418 a thumb piece 419 carrying a cam groove 420 therein cooperating with the screw 421 placed in the connection 415 and having the operating stop pieces 422 and 423 limiting the movement thereof. By pressing on the piece 423 the bottle is secured in place, and by pressing on the piece 422 the two connecting members are separated.

I have previously mentioned the wires carrying 110 volt current to the branch 140 in the conduit, thence up to the main switch 120, thence back to the branch 140, and described the leads downward from the branch 140. From the bus-bar (not shown) in the casing 424$^b$ are four wires (not shown), two for the heating lamp 118 for the hot water spray bottle and two for the incandescent lamps 121 and 122. For a fuller description of these lamps and their connection, reference may be had to the companion patent to Hanberg, which I expect to have issued simultaneously herewith.

The water for the drinking glass, cuspidor and cold water syringe enters through a pipe 425 (see Fig. 4) which is controlled by a shut-off valve 105 (see Fig. 3) which need not be described, as it may be of any desired construction, and which, as best seen in Fig. 36, opens into the forward end of the strainer shown in Figs. 36 to 39. This consists of a generally cylindrical casing 426 having the bracket 427, by which it is bolted to the inside of the panel 95, cast integral therewith. On the outer end is the annular flange 428 having the drainage extension 429 projecting out through an opening 114 provided in the panel 112 for that purpose. This end of the casing 426 is normally closed by a plug 430 having the wrench abutment 431 on its outer face and the threaded portion 432 screwed into the open end of the casing, and the annular offset 433 which squeezes the water sealing washer 434 to make a water-tight joint. When the plug is screwed out, the bail 435 secured to the externally threaded annulus 436 may be grasped by the fingers to turn it to unscrew the annulus 436 out of its seat 437 formed in the interior of the cylinder 426. The annulus 436 has the strainer cup 438 which may be made of wire of any desired mesh, secured thereto, and the water enters through the pipe 425 secured by the connecting nut 439 to the nipple 440 opening into the casing in front of the cup 438 so that all water leaving the casing 426 through the four nipples 441, 442, 443 and 444 must pass therethrough. The pipe 445 connected by the nut 446 to the nipple 441 extends to the saliva tube valve 447 (see Fig. 4) which, as it is substantially the same as the air valve shown in Fig. 21, need not be further described, and it is controlled by the handle 108 projecting from the face 95 of the pedestal as heretofore described. The pipe 448 leads to the saliva tube device 109 already mentioned as of a known construction and consequently not needing further description. The overflow pipe 449 in the finger bowl 68 (see Fig. 14) has the elbow 450 connecting it to a pipe 451 also opening into the drain portion of the saliva tube device 109 which is connected to the large drain pipe 452 also connected to the spittoon and extending down through the bottom of the pedestal. The saliva ejector glass 110 is connected to the tube 103 already mentioned as seen in Figs. 18 to 20, and it is extended down through the bracket 453 over the sheave 454 (mounted (seen in Fig. 4) in the same manner and for the same purpose as the sheave 214) and thence up to the casing 455 constituting a part of the known saliva tube device 109 heretofore referred to.

To take the strain of the weight of so much of the tube 103 as is within the pedestal, and the pull of the spring attached to the sheave 454, off of the patient's mouth when the tube is in use, I secure on the bracket piece 456 (see Figs. 18 to 20) extending downwardly from the plate 101 to which it is secured, the spring clip 457, generally U-shaped, but having the widened end. When the tube 103 is pulled out and the glass 110 is applied to the patient's mouth, the operator pulls the tube horizontally outward until it is forced into the clip, as seen in dotted lines in Fig. 19, where the elasticity of the tube (somewhat flattened thereby at that point) holds it in place. When he is through with the ejector, the tube is pulled forward and inward, releasing it from the clip 457, when the coil spring attached to the sheave 454 pulls it back into the pedestal.

The pipe 458 connected to the nipple 442 by the nut 459 extends upward to the casing 460 of the valve 98 controlling the supply of water to the cuspidor. As this valve is of the same construction as the valve 137 for the hot air syringe shown in Fig. 21, except that its outlet pipe 461 is secured to the end instead of the side of the casing, as indicated in dotted lines in Fig. 21, it need not be further described. The pipe 461 extends through an aperture (not shown) in the body of the pedestal and beneath the cover strip 99 to the spittoon supply nozzle (not shown) which is of a customary and well known construction.

The pipe 462 connected by the nut 463 to the nipple 443 extends downward (see Fig. 4) then upward (see Fig. 5) in the angle between the faces 111 and 123 (see Fig. 3) up to the level of the valve casing 73 of the drinking cup and finger bowl valve 74, which it enters by the customary nipple and connection on it. This valve which may be of any desired construction controls the flow of the water from the nozzle 72 (see Fig. 5) projecting down from the valve body 73 through an aperture 404 in the top of the canopy 75. The water overflowing from the glass runs down into the finger bowl 68, and is discharged therefrom as heretofore described.

The pipe 465, connected to the nipple 444 by the nut 466 (as seen in Fig. 39) extends downward and then upward (see Fig. 5) to the cold water syringe valve casing 467 which is like the valve 137, shown in detail in Fig. 21, except that the outlet is in the end and has connected to it the flexible tube 468 which runs downward and around the sheave 469 mounted just as is the sheave 214, shown in Fig. 6, then upward through a guide loop 470 secured on the top of the valve casing 467, thence through the socket 67 to the cold water syringe 66 which is of a known construction, and needs no description.

While I have shown and described my invention as embodied in the form which I at present consider best adapted to carry out its purposes, it will be understood that it is capable of modifications, and that I do not desire to be limited in the interpretation of the following claims, except as may be necessitated by the state of the prior art:

1. In a dental unit, the combination with a hollow pedestal extending vertically upward from the bottom thereof, of a spittoon bowl at one side thereof, a hollow bracket from the pedestal to the bowl, a motor mounted on the top of the pedestal, an arm extending from the pedestal on the side opposite the bowl, a Bunsen burner at the end of the arm, and valves carried by the pedestal for controlling the water supply to the bowl and gas to the Bunsen burner.

2. In a dental unit, the combination with a hollow pedestal having offset portions therein, of covers for said offset portions, sockets extending inwardly from the covers, implements adapted to be seated in the sockets, means within the pedestal for supplying said implements with actuating fluid, and flexible connections from said means to the implements, substantially as and for the purpose described.

3. In a dental unit, the combination with a hollow pedestal extending vertically upward from the bottom thereof, of a spittoon bowl at one side thereof, a hollow bracket from the pedestal to the bowl, a motor mounted on the top of the pedestal, an arm extending from the pedestal on the side opposite the bowl, a Bunsen burner at the end of the arm, a second arm extending from the outer end of the first, a table carried by the outer end of the second arm, and valves carried by the pedestal for controlling the water supply to the bowl and gas to the Bunsen burner.

4. In a dental unit, the combination with a hollow pedestal, of a motor supporting plug mounted to turn in said pedestal, wires in the pedestal for carrying current to the motor, and connections between the wires and the plug for supplying current to the motor in any position of the plug.

5. In a dental unit, the combination with a hollow pedestal, of a motor supporting plug mounted to turn in said pedestal, wires in the pedestal for carrying current to the motor, and connections between the wires and the plug for supplying current to the motor in any position of the plug, said connections consisting of four contacts terminating at different heights in a circular socket in the pedestal with four insulating collecting rings on the periphery of the plug cooperating therewith.

6. In a dental unit, the combination with a hollow pedestal, of a motor supporting plug mounted to turn in said pedestal, wires in the pedestal for carrying current to the plug, connections between the wires and plug for supplying current to the motor in any position of the plug, a fork attached to the plug, a motor mounted to turn on a horizontal axis in said fork, and electrical connections from the plug through the fork to the motor for supplying current thereto.

7. In a dental unit, the combination with a hollow pedestal, of a motor supporting part mounted to turn in said pedestal, wires in the pedestal for carrying current to the motor, connections between the wires and the operative in any position of the latter, a fork attached to the part, a pair of U-shaped arms in the fork, a motor mounted to turn on a horizontal axis in the outer end of the arms, electrical connections from the plug through the fork and arms to the motor for supplying current thereto, and means for temporarily securing one of the U-shaped arms in the fork so that by releasing and turning it the motor may be detached from the fork.

8. In a dental unit, the combination with a pedestal, of a looped flexible carrying member attached thereto at one end, a dental implement connected to the other end of the member, a guide carried by the pedestal through which the carrying member is withdrawn, an anti-friction device in the bottom of the loop, and a helically coiled contractile spring secured at its upper end to the anti-friction device and at its lower end to some stationary object.

9. In a dental unit, the combination with a pedestal, of a looped flexible carrying member attached thereto at one end, a dental implement secured to its other end, a guide carried by the pedestal through which the flexible carrying member is withdrawn, and a gripping device located adjacent the guide and having parallel jaws with their outer ends diverging and adapted when desired to hold the flexible carrying member in any position to which it may have been withdrawn by flattening the same between the parallel jaws.

10. In a dental unit, the combination with a pedestal, of a looped flexible carrying member attached thereto at one end, a dental implement secured to its other end, a guide carried by the pedestal through which the flexible carrying member is withdrawn, and a spring clip adjacent the guide adapted to hold the flexible carrying member in any position to which it may have been withdrawn.

11. In a dental unit, the combination with a pedestal, of a looped flexible carrying member attached thereto at one end, a dental implement at the other end, a guide and gripping mechanism carried by the pedestal consisting of an upper member having an elongated aperture therein, a lower member having a circular aperture therein, a connecting piece, and a spring clip carried by said connecting piece and having a flared opening, the body of the clip being narrower than the natural diameter of the flexible carrying member.

12. In a dental unit, the combination with a wall, of a knob mounted to turn in said wall, a valve casing secured within the wall, inlet and outlet ports in said valve casing, a valve nipple connected with one of said ports, a valve member cooperating with said nipple, and connections between said valve casing, valve member and knob such that rotating the knob seats and unseats the valve member.

13. In a dental unit, the combination with a wall, of a knob mounted to turn in said wall, a valve casing secured within the wall, inlet and outlet ports in said valve casing, a valve nipple connected with one of said ports, a valve member cooperating with said nipple, an angular socket in the inner end of the knob, a stem connected to the valve member having its outer end shaped to fit in the socket, and a portion thereof smooth to pass through a stuffing box carried by the valve casing and another portion thereof threaded to cooperate with a nut carried by the stuffing box.

14. In a dental unit, the combination with a wall, of a valve casing secured therein, a knob having a threaded end screwed into the outer end of the valve casing, a cup disk in the valve casing, a ball interposed between hemispherical recesses in the end of the knob and the cup disk, a diaphragm secured at its edges in the valve casing, a second cup disk secured to the diaphragm, a helically coiled expanding spring interposed between the two cup disks, a chamber beyond the diaphragm, an outlet therefrom, an inlet port, a spring pressed valve closing the inlet port, and a rod connected to the diaphragm opening the valve.

15. In a dental unit, the combination with a wall, of a valve casing secured therein, a knob having a threaded end screwed into the outer end of the valve casing, a cup disk in the valve casing, a ball interposed between hemispherical recesses in the end of the knob and the cup disk, a diaphragm secured at its edges in the valve casing, a second cup disk secured to the diaphragm, a helically coiled expanding spring interposed between the two cup disks, a chamber beyond the diaphragm, an outlet therefrom, a radial inlet port, a passage into which it opens coaxially with the valve body, a cup-shaped valve member sliding in said passage and closing the inlet port, a helically coiled expanding spring in said passage and cooperating with the valve, and a stem projecting from the diaphragm to engage the valve.

16. In a dental unit, the combination with a spray bottle, of a valve member cooperating therewith, a female connection carried by one, a male connection carried by the other, a locking plate pivoted on one of said connections, and a pin carried by the other, said locking plate having a cam groove open at one end into which the pin extends.

17. In a dental unit, the combination with a spray bottle, of a valve member cooperating therewith, a female connection carried by one, a male connection carried by the other, a locking plate pivoted on one of said connections, and a pin carried by the other, said locking plate having a cam groove open at one end into which the pin extends and having two downwardly extending stop flanges on either side thereof.

18. In a dental unit, the combination with a hollow pedestal, of a filter casing mounted therein near the wall of the pedestal, a closing plug screwed into the casing which can be removed from the outside of the pedestal, a supply port for water opening into the casing, an outlet port from the casing, and a water strainer interposed in the casing between the two ports which can be removed when the plug is removed.

19. In a dental unit, the combination with a hollow pedestal, of a filter casing mounted therein near the wall of the pedestal, a closing plug screwed into the casing which can be removed from the outside of the pedestal, a supply port for water opening into the casing, an outlet port from the casing, and a water strainer interposed in the casing between the two ports which can be removed when the plug is removed, said strainer consisting of a threaded ring screwed into an annular flange between the two ports and carrying a cylindrical basket of fine mesh wire.

20. In a dental unit, the combination with a hollow pedestal, of a filter casing mounted therein near the wall of the pedestal, a closing plug screwed into the casing which conbe removed from the outside of the pedestal, a supply port for water opening into the casing, an outlet port from the casing, and a water strainer interposed in the casing between the two ports which can be removed when the plug is removed, said strainer consisting of a threaded ring screwed into an annular flange between the two ports and carrying a cylindrical basket of fine mesh wire on the inner side and a bail for turning and withdrawing the threaded ring on the outer side.

21. In a dental unit, the combination with a hollow pedestal, of an air filter casing secured in an opening therein, a port opening into one side of the casing, another port opening into the inner end thereof, a removable cover secured to the pedestal about the opening and closing the same, a pair of foraminous concentric cylinders in the casing, and an air filtering material between the cylinders, said cylinders being located between the two ports so that air passing from one to the other must pass through the air filtering material.

22. In a dental unit, the combination with a hollow pedestal, of an air filter casing secured in an opening therein, a port opening into one side of the casing, another port opening into the inner end thereof, a removable cover secured to the pedestal about the opening and closing the same, a pair of foraminous concentric cylinders in the casing, an air filtering material between the cylinders, said cylinders being located between the two ports so that air passing from one to the other must pass through the air filtering material, and means for holding the cylinders pressed firmly against the rear end of the casing.

23. In a dental unit, the combination with a hollow pedestal, of an air filter casing secured in an opening therein, a port opening into one side of the casing, another port opening into the inner end thereof, a removable cover secured to the pedestal about the opening and closing the same, a pair of foraminous concentric cylinders in the casing, and air filtering material between the cylinders, said cylinders being located between the two ports so that air passing from one to the other must pass through the air filtering material, and means for holding the cylinders pressed firmly against the rear end of the casing, said means consisting of a helically coiled expanding spring interposed between the inside of the removable cover and a disk closing the outer ends of the cylinders.

24. In a dental unit, the combination with a hollow pedestal, of a cylindrical air filter casing secured in an opening therein, a port located in the center of the inner end of the casing and having an annular rib with its outer face tapering surrounding the port, another port opening into the center of the side of the casing, a removable cover secured to the pedestal about the opening and closing the same, a pair of foraminous concentric cylinders in the casing connected at their outer ends, air filtering material between the cylinders, and means for holding the cylinders pressed firmly against the rear end of the casing, the inner cylinder being guided by the tapered face of the annular rib.

25. In a dental unit, the combination with a hollow pedestal, of a cylindrical air filter casing having a radially extending flange at its outer end, the outer portion of which flange fits against the inside of the pedestal, a cylindrical flange extending outwardly from the middle of the radial flange, an inwardly extending radial flange from the outer end of the cylindrical flange, an annular packing gasket between the last mentioned flange and the cover, said cover removably secured to the pedestal about the opening and closing the same, a port opening into one side of the casing, another port opening into the inner end thereof, a pair of foraminous concentric cylinders in the casing, air filtering material between the cylinders, said cylinders being located between the two ports so that air passing from one to the other must pass through the air filtering material, and means for holding the cylinders concentric with the casing.

26. In a dental unit, the combination with a pedestal, of means for supplying compressed air carried thereby, a flexible tube connected to said means, a hot air syringe secured to the outer end of the flexible tube, a pair of wires coiled about the tube but insulated from each other and carrying current to the air heating element, and an outer tube surrounding and protecting the wires.

27. In a dental unit, the combination with a pedestal, of means for supplying compressed air carried thereby, a flexible tube connected to said means, a hot air syringe secured to the outer end of the flexible tube, a pair of wires coiled about the tube but insulated from each other and carrying current to the air heating element, an outer tube surrounding and protecting the wires, and a valve interposed between the inner end of the inner tube and the hot air syringe to control the supply of air thereto.

28. In a dental unit, the combination with a pedestal, of means for supplying compressed air carried thereby, a flexible tube connected to said means, a hot air syringe secured to the outer end of the flexible tube, a pair of wires coiled about the tube but insulated from each other and carrying current to the air heating element, an outer tube surrounding and protecting the valve, a valve interposed between the inner end of the inner tube and the hot air syringe to control the supply of air thereto, an electric switch in the circuit of the wires, and means for simultaneously opening the valve and closing the switch.

29. In a dental unit, the combination with a pedestal, of means for supplying compressed air carried thereby, a flexible tube connected to said means, a hot air syringe secured to the outer end of the flexible tube, a pair of wires coiled about the tube but insulated from each other and carrying current to the air heating element, an outer tube surrounding and protecting the valve, a valve interposed between the inner end of the inner tube and the hot air syringe to control the supply of air thereto, an electric switch in the circuit of the wires, and means for simultaneously opening the valve and closing the switch, said means consisting of an insulating disk having a shoulder cooperating with the electric switch and a valve body cooperating with a valve seat.

30. In a dental unit, the combination with a pedestal, of means for supplying compressed air carried thereby, a flexible tube connected to said means, a hot air syringe secured to the outer end of the flexible tube, a pair of wires leading to the hot air syringe carrying current to the air heating element thereof, a hollow nozzle for the hot air syringe having the heating element therein, and a nipple having a ball bearing therefor in the nozzle.

31. In a dental unit, the combination with a pedestal, of means for supplying compressed air carried thereby, a flexible tube connected to said means, a hot air syringe secured to the outer end of the flexible tube, a pair of wires leading to the hot air syringe carrying current to the air heating element thereof, a hollow nozzle for the hot air syringe having the heating element therein, a nipple having a ball bearing therefor in the nozzle, and a helically coiled expanding spring in the nozzle cooperating with the nipple to hold it in any adjustment.

32. In a dental unit, the combination with a pedestal, of means for supplying current at the proper voltage, a pair of wires leading from said means, a mouth lamp handle in which the wires terminate in separated contacts, a lamp holder adapted to fit in the handle with one contact out of engagement with the handle contact, and a sleeve movable on the handle and cooperating with one of the handle contacts.

33. In a dental unit, the combination with a pedestal, of means for supplying current at the proper voltage, a pair of wires leading from said means, a mouth lamp handle in which the wires terminate in separated contacts, a lamp holder adapted to fit in the handle with one contact out of engagement with the handle contact, a sleeve movable on the handle and cooperating with one of the handle contacts, a split sleeve holder externally threaded, a mirror rod in the split sleeve, and a nut threaded on the split sleeve to hold the rod in any adjustment.

34. In a dental unit, the combination with a pedestal, of means for supplying current at the proper voltage, a pair of wires leading from said means, a mouth lamp handle in which the wires terminate in separated contacts, a lamp holder adapted to fit in the handle, and a sleeve having its outer end longer on one side than the other to cooperate with a lamp bulb in the lamp holder.

35. In a dental unit, the combination with a pedestal, of means for supplying current at the proper voltage, a pair of wires leading from said means, a mouth lamp handle in which the wires terminate in separated contacts, a lamp holder adapted to fit in the handle with one contact out of engagement with the handle contact, a sleeve movable on the handle and cooperating with one of the handle contacts, a split sleeve holder externally threaded, a mirror rod in the split sleeve, a nut threaded on the split sleeve to hold the rod in any adjustment, and a sleeve having its outer end longer on one side than the other mounted on the outer end of the lamp holder to cooperate with the lamp bulb in said holder.

36. In a dental unit, the combination with a pedestal, of means for supplying compressed air carried thereby, a flexible tube connected to said means, a warm water spray bottle, and a valve secured to the outer end of the tube and to the spray bottle, said valve comprising a cylindrical casing opening into the tube, a spring pressed valve sliding in the casing, a valve seat with which it cooperates, a plunger extending down through the top of the valve member and engaging the valve, and a lever cooperating with the plunger.

37. In a dental unit, the combination with a pedestal, of means for supplying compressed air carried thereby, a flexible tube connected to said means, a warm water spray bottle, a valve mechanism secured to the outer end of the tube and to the spray bottle, said mechanism comprising a cylindrical casing opening into the tube, a hollow spring pressed valve sliding in the casing, a valve seat with which it cooperates, a plunger extending down through the top of the valve mechanism and engaging the valve, a packing for the plunger, and a lever cooperating with the outer end of the plunger.

38. In a dental unit, the combination with a hollow pedestal, of means for supplying relatively high voltage current therein, fuses for said means, a transformer within the pedestal connected to the fuses, a rheostat having its controlling means outside of the pedestal, low voltage fuses connected to the rheostat, a hot air syringe having a heating element therein, wires connecting said heating element with the low voltage fuses, means for supplying compressed air within the pedestal, a valve controlling the pressure operable from outside the pedestal, and flexible tubing connecting the compressed air supply with the hot air syringe.

39. In a dental unit, the combination with a hollow pedestal, of means for supplying relatively high voltage current therein, fuses for said means, a transformer within the pedestal connected to the fuses, a rheostat having its controlling means outside of the pedestal, low voltage fuses connected to the rheostat, a hot air syringe having a heating element therein, wires connecting said heating element with the low voltage fuses, means for supplying compressed air within the pedestal, a valve controlling the pressure operable from outside the pedestal, flexible tubing connecting the compressed air supply with the hot air syringe, and an insulating tube surrounding the air tube and enclosing the wires.

40. In a dental unit, the combination with a hollow pedestal, of a source of compressed air within the same, a pressure reducing valve connected to said source, a pressure controlling valve operable through the wall of the pedestal, a spray bottle, a flexible connection from the pressure controlling valve to the spray bottle, a second pressure controlling valve operable through the wall of the pedestal, a hot air syringe, and a flexible connection from the second pressure controlling valve to the hot air syringe.

41. In a dental unit, the combination with a hollow pedestal, of a source of compressed air within the same, an air filter through which all the compressed air must pass, a pressure reducing valve connected to said source, a pressure controlling valve operable through the wall of the pedestal, a spray bottle, a flexible connection from the pressure controlling valve to the spray bottle, a second pressure controlling valve operable through the wall of the pedestal, a hot air syringe, and a flexible connection from the second pressure controlling valve to the hot air syringe.

42. In a dental unit, the combination with a pedestal, of means for supplying electric current thereto, a cable connected to said means, a contact carrying member at the outer end of the cable, a sleeve carried by said member having a slot with an offset therein, a ring on the sleeve having a pin adapted to enter the slot, and an implement holder adapted to fit in the sleeve and carrying a radial pin adapted to enter the slot and be held in the offset by the ring pin.

43. In a dental unit, the combination with a pedestal, of means for supplying electric current thereto, a cable connected to said means, a contact carrying member at the outer end of the cable, a sleeve carried by said member having a slot with an offset therein, a ring on the sleeve having a pin adapted to enter the slot, an implement holder adapted to fit in the sleeve and carrying a radial pin adapted to enter the slot and be held in the offset by the ring pin, and a sliding sleeve cooperating with one of the contacts to close the circuit through the implement, said sleeve engaging the ring to lock the implement in place when the circuit is closed.

In witness whereof, I have hereunto set my hand and affixed my seal, this 12th day of July, A. D. 1921.

ROBERT G. CRANE. [L. S.]

Witness:
JOHN HOWARD McELROY.